United States Patent [19]

Stillman et al.

[11] Patent Number: 4,629,387
[45] Date of Patent: Dec. 16, 1986

[54] DIP TUBE LOADING/UNLOADING APPARATUS

[75] Inventors: Ben S. Stillman, Cupertino; Barry J. Boricchio, Campbell, both of Calif.

[73] Assignee: Adcotech Corporation, Milpitas, Calif.

[21] Appl. No.: 705,544

[22] Filed: Feb. 26, 1985

Related U.S. Application Data

[63] Continuation-in-part of Ser. No. 612,035, May 18, 1984, abandoned.

[51] Int. Cl.⁴ .............................................. B65G 65/23
[52] U.S. Cl. .................................... 414/404; 29/759; 198/394; 198/465.3; 414/421
[58] Field of Search ............... 414/403, 414, 418, 425, 414/404, 421; 198/379, 394, 395, 399, 465.1, 465.3, 533, 774; 221/11, 103, 104; 53/247, 251, 266 R, 389, 390; 29/741, 759, 809

[56] References Cited

U.S. PATENT DOCUMENTS

| | | | |
|---|---|---|---|
| 2,272,690 | 2/1942 | Carroll | 198/395 X |
| 3,276,566 | 10/1966 | Raasch | 198/395 |
| 3,305,128 | 2/1967 | Dearsley | 198/533 X |
| 3,526,344 | 9/1970 | Koning | 198/533 X |
| 4,063,635 | 12/1977 | Heckel | 198/533 X |
| 4,171,041 | 10/1979 | Lowe | 198/379 |
| 4,194,865 | 3/1980 | Bandoh | 414/403 |
| 4,306,647 | 12/1981 | Boucherie | 198/379 |
| 4,401,234 | 8/1983 | Droira et al. | 221/103 X |
| 4,407,406 | 10/1983 | Norris | 198/774 |
| 4,498,574 | 2/1985 | Fischer | 198/394 X |
| 4,500,246 | 2/1985 | Janisiewicz et al. | 414/403 X |

Primary Examiner—Joseph E. Valenza
Assistant Examiner—David A. Bucci
Attorney, Agent, or Firm—Hamrick, Hoffman, Guillot & Kazubowski

[57] ABSTRACT

DIP tube handling apparatus including an input hopper 62 suitable for containing a quantity of randomly oriented DIP container tubes, agitating, singulating and metering means 34 at the bottom of the hopper 12 for causing one tube at a time to leave the hopper 12 under the influence of gravity, a pair of walking beams 26, 28 for moving the singulated DIP tube to an orientation station, an orientation device 30 for orienting the tubes so that the tubes and DIPs contained therein are positioned top side up, a tube inclining means 110 for causing the tube to be inclined so that DIPs may slide therefrom under the influence of gravity, either into the tube from a supply chute or out of the tube into a discharge chute, and an output hopper 14 for receiving tubes that have been loaded or unloaded.

27 Claims, 22 Drawing Figures

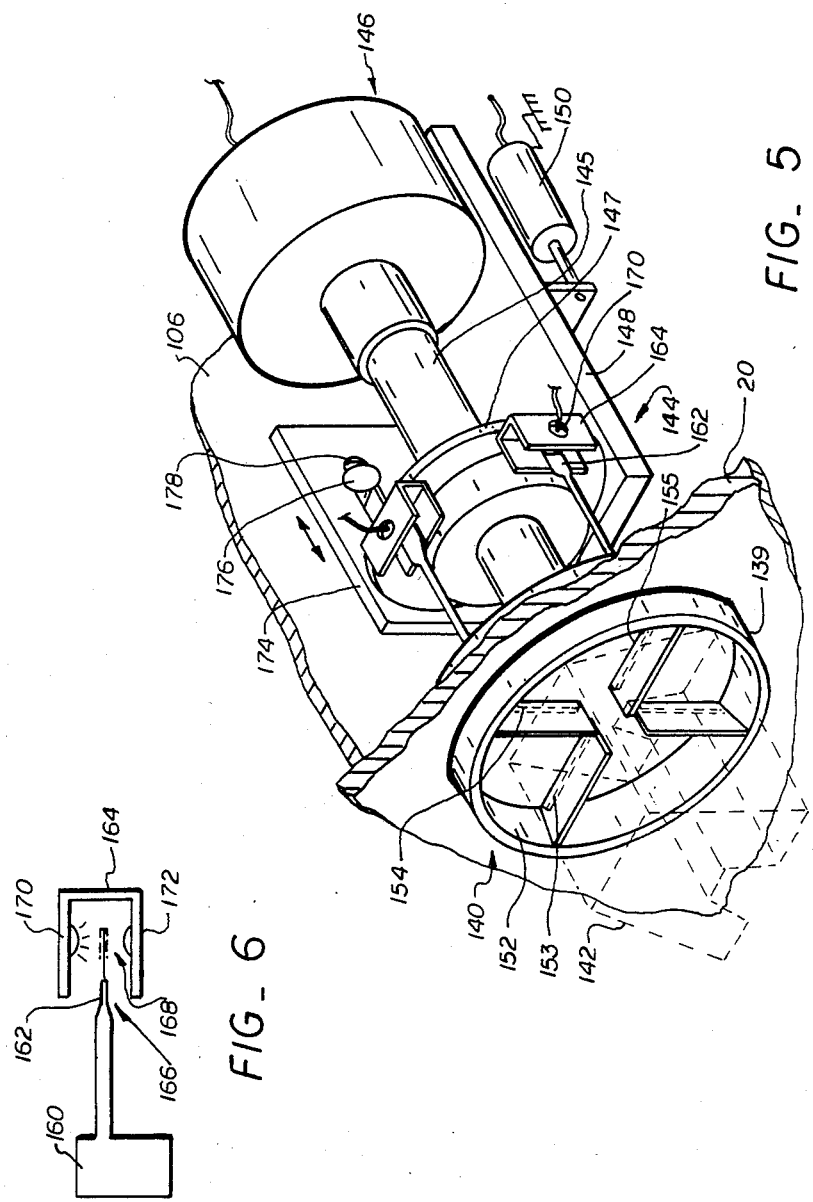

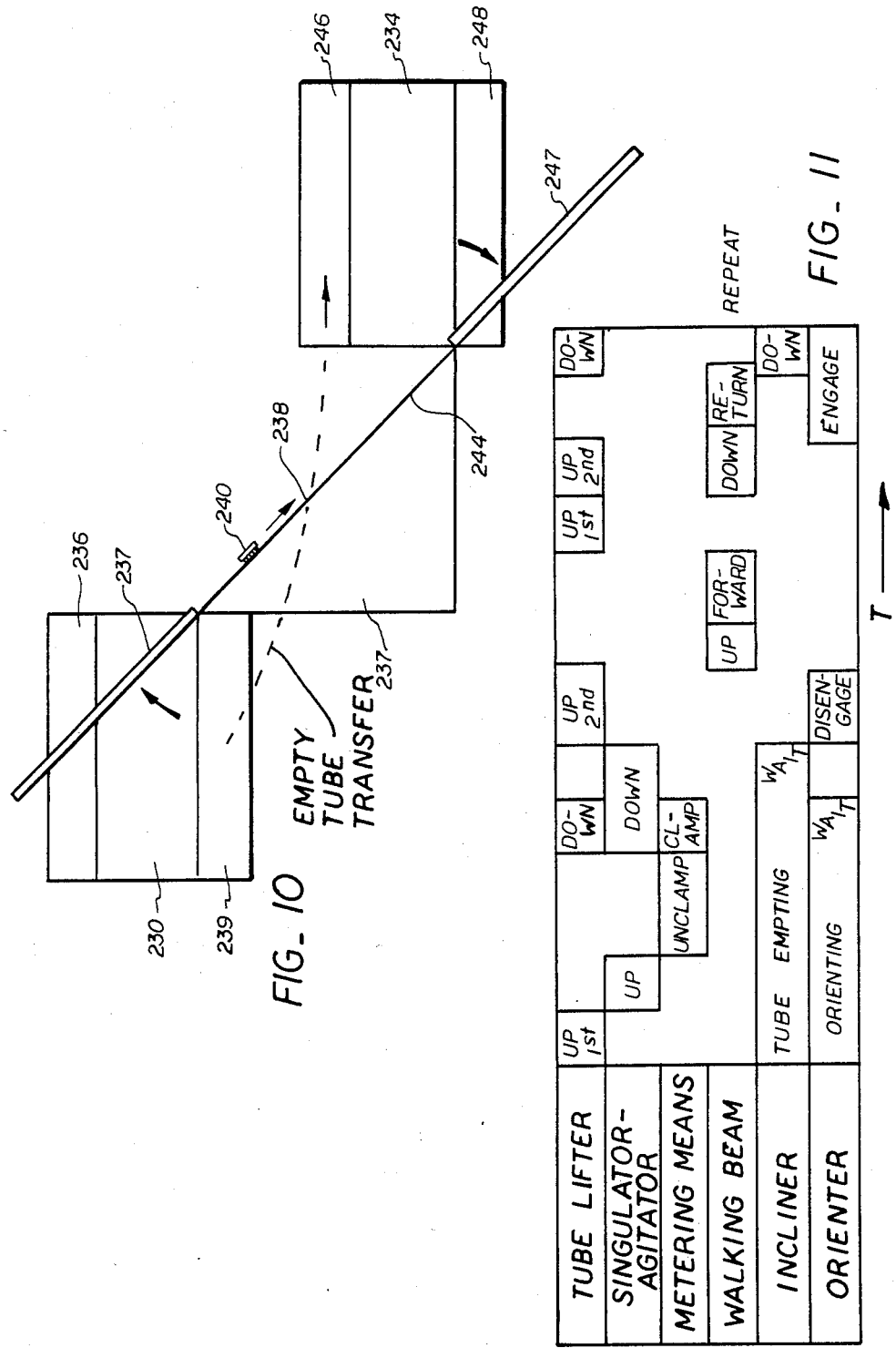

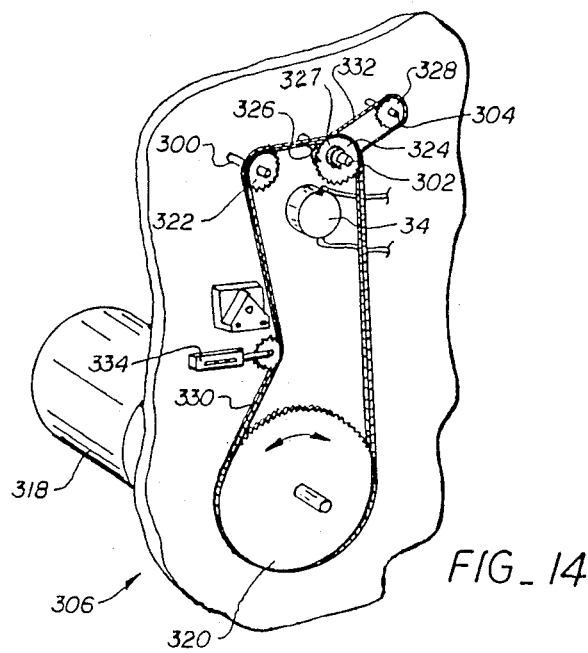
FIG_14
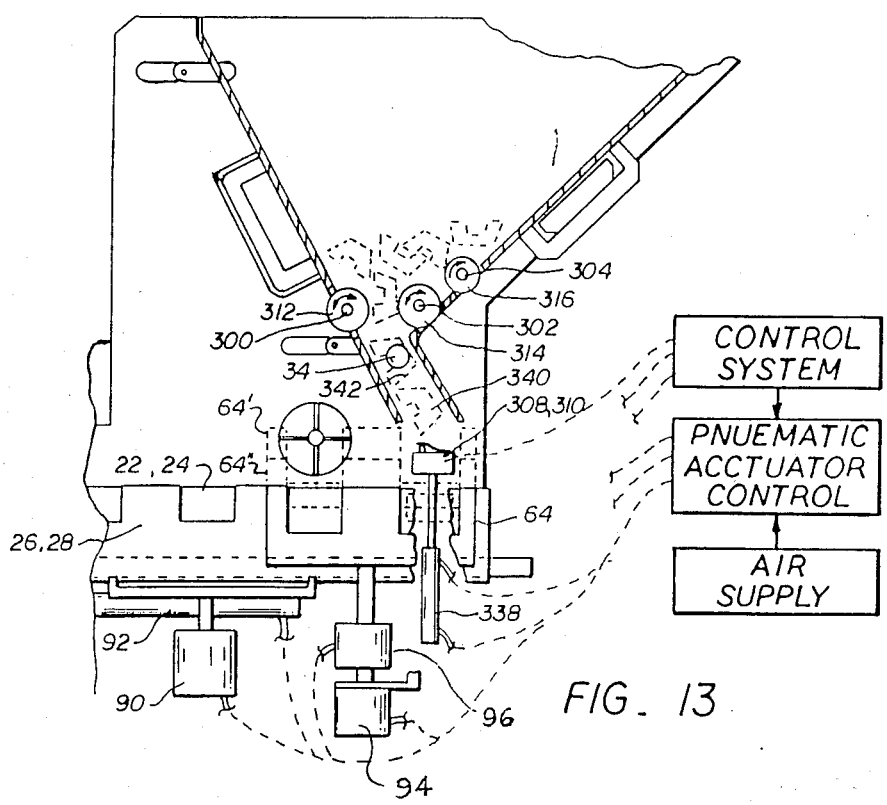
FIG_13

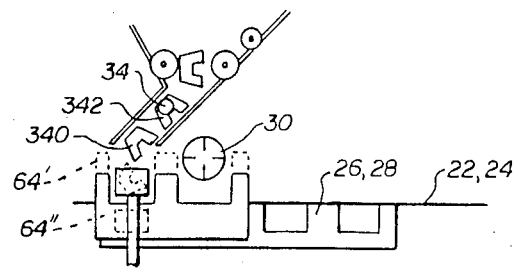
FIG_ 15(a)
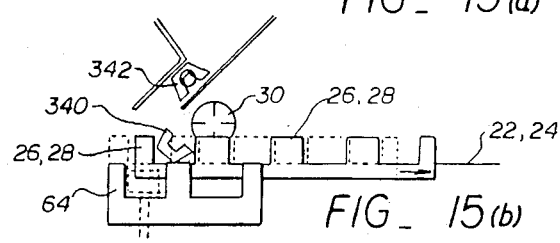
FIG_ 15(b)
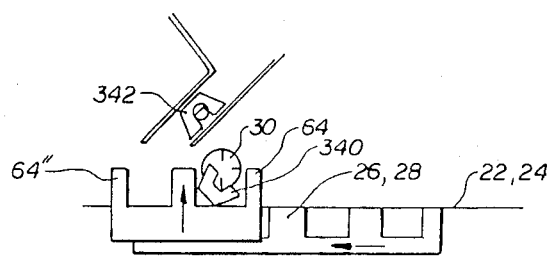
FIG_ 15(c)
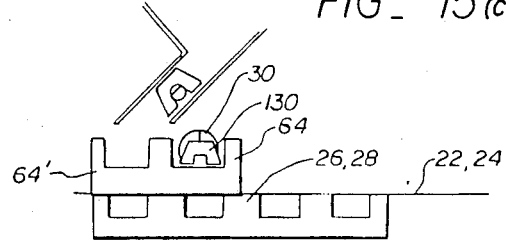
FIG_ 15(d)

DIP TUBE LOADING/UNLOADING APPARATUS

This application is a continuation-in-part of copending application Ser. No. 612,035 filed May 18, 1984, now abandoned.

BACKGROUND OF THE INVENTION

1. Field of the Invention

This invention relates generally to apparatus for the handling of DIP tubes, and more particularly to apparatus for the automatic loading and unloading of shipping tubes used for packaging DIPs.

2. Description of the Prior Art

Integrated circuit electronic components are usually manufactured in dual in-line packages (DIPs) comprised of elongated bodies with a plurality of legs extending symmetrically down from the sides of the package. DIPs are normally packaged for ease of handling and for shipment from the manufacturer to the customer in long U-shaped (in cross-section) tubes containing many DIPs. At some time following manufacture, the DIPs must be marked and tested, usually by automatic or semi-automatic equipment. In conventional practice, the DIPs are manually unloaded from the tubes into the testing or marking device or the tubes are hand loaded into the magazine of a mechanical unloading system. Following processing, the DIPs are then reloaded into tubes.

As the manufacture of DIPs becomes more automated, the manual placing of the tubes to have DIPs loaded therein, or to have DIPs unloaded therefrom, is not economically attractive because it adds labor cost and slows down the assembly process. A method and apparatus for automatic handling of large quantities of randomly oriented tubes and loading or unloading DIPs from them is disclosed in the copending application of Ben S. Stillman entitled "DIP Tube Loading/Unloading Apparatus", Ser. No. 612,035 filed May 18, 1984 now abandoned and assigned to the assignee of the present invention.

Although the apparatus disclosed in the above-referenced application works quite well with most types of DIP tubes, it has been found that the tubes used to contain the larger sized DIPs such as the relatively new type 600 DIPs (DIPs having width of 0.600 inch) for example, because of certain relationships of their configurational dimensions, tend to become interlocked with each other in a manner that tends to cause jambs in the input hopper of the original Stillman device referred to above.

SUMMARY OF THE PRESENT INVENTION

It is therefore an object of this invention is to provide an improved apparatus for automatically loading and/or unloading DIPs into or from DIP shipping tubes.

Another objective of this invention is to provide apparatus for the automatic handling of high volumes of tubes.

A further object of this invention is to provide apparatus for the automatically orienting the tubes prior to their presentation to an automatic processing operation.

Yet another object of this invention is to provide apparatus for the automatic presentation and unloading and/or loading of DIP tubes into or out of an automatic DIP processing machine operation.

These and other objects of the invention are provided by an apparatus including an input hopper suitable for containing a quantity of randomly oriented DIP container tubes, agitating, singulating and metering means at the bottom of the hopper for causing one tube at a time to leave the hopper under the influence of gravity, a pair of walking beams for moving the singulated DIP tube to an orientation station, an orientation device for orienting the tubes so that the tubes and DIPs contained therein are positioned top side up, a tube inclining means for causing the tube to be inclined so that DIPs may slide therefrom under the influence of gravity, either into the tube from a supply chute or out of the tube into a discharge chute, and an output hopper for receiving tubes that have been loaded or unloaded.

IN THE DRAWINGS

Figure 1:
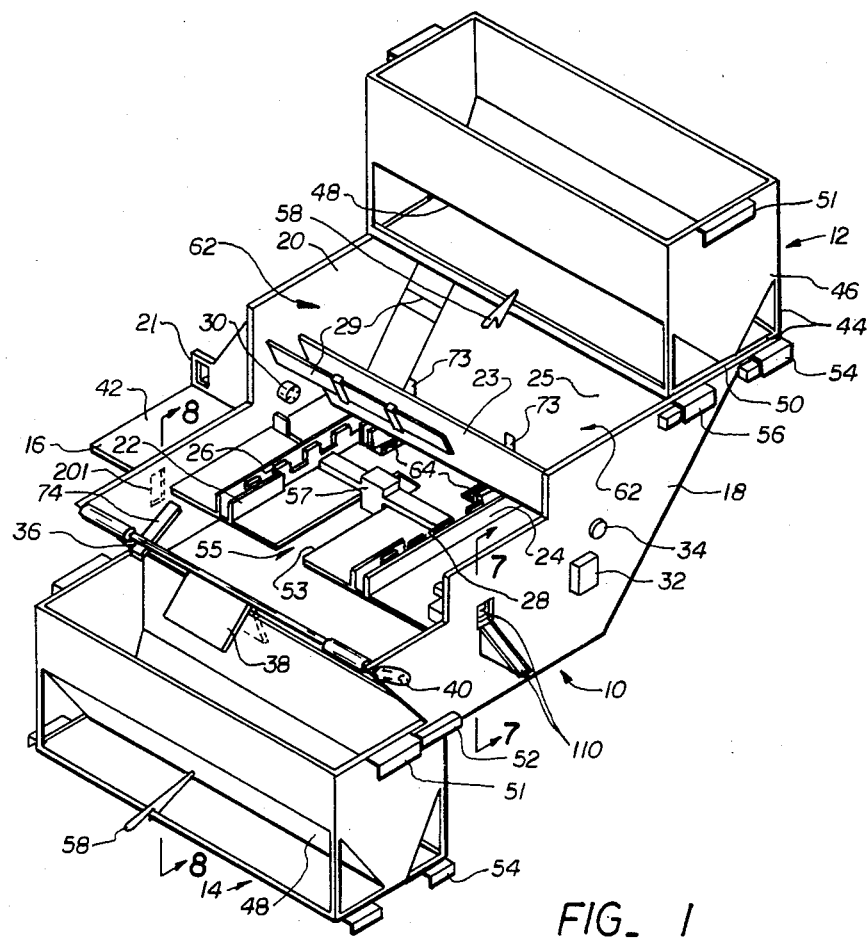
FIG. 1 shows a perspective view of an apparatus of the present invention.
Figure 7:
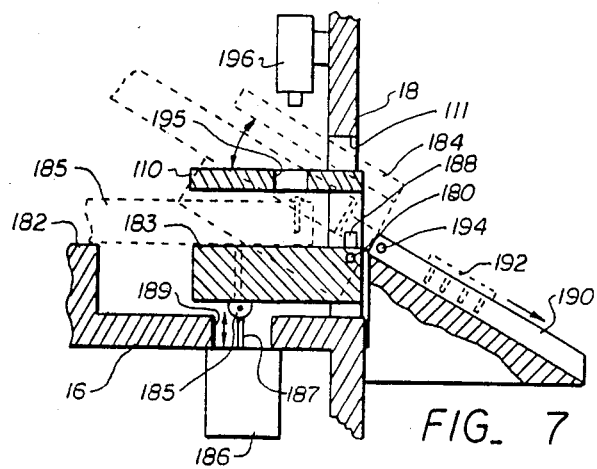
Figure 8:
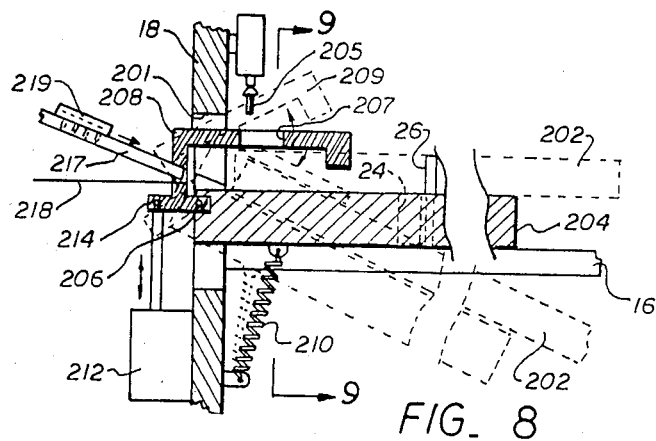
Figure 9:
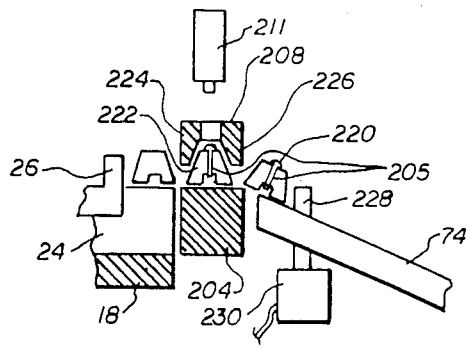
Figure 12A:
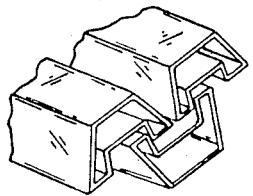
Figure 12B:
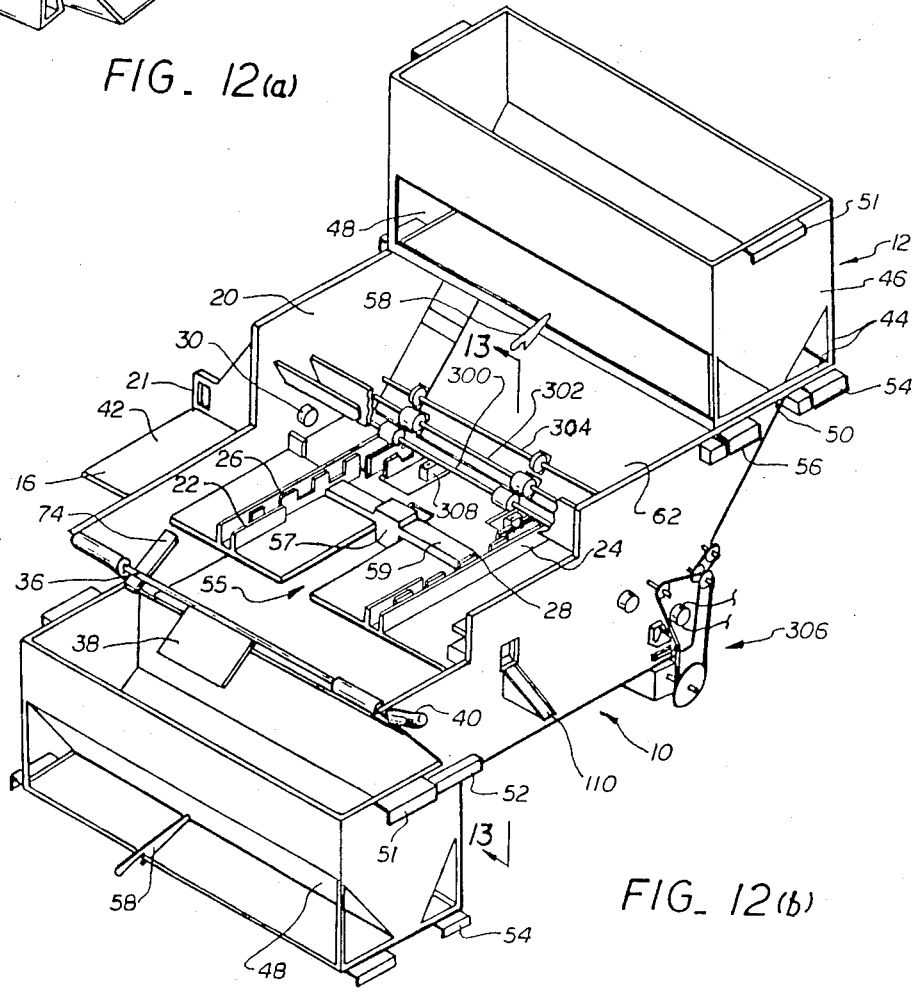

FIGS. 4(a)-(d) are a set of schematic diagrams showing the unloading and loading of DIPs into a processing machine;

FIG. 5 shows a perspective view of the tube axial orientation device of the present invention;

FIG. 6 shows detail of the detection apparatus of the axial orientation device;

FIG. 7 is a partially broken cross-section taken along line 7—7 of FIG. 1 showing the tube inclining and DIP unloading device of the present invention;

FIG. 8 is a partially broken cross-section showing an alternative embodiment of the tube inclining and DIP loading device of the present invention as it would be located along the line 8—8 of FIG. 1;

FIG. 9 is a cross-section taken along the line 9—9 of FIG. 8;

FIG. 10 shows a schematic diagram of how the unloader and loader configurations of this invention can be joined and used to process DIPs contained in DIP tubes;

FIG. 11 shows a timing diagram illustrating operation of the present invention;

FIG. 12(a) is a broken perspective view showing three interlocked tubes;

FIG. 12(b) is a perspective view of an improved embodiment partially broken away to show certain details thereof;

FIG. 13 is a partial cross-sectional view taken along the line 13—13 of FIG. 12;

FIG. 14 is an illustration of the drive system for the agitator mechanism of the embodiment of FIG. 12(b); and FIGS. 15(a)-(d) are a series of diagrams illustrating operation of a portion of the subject invention.

DETAILED DESCRIPTION OF THE PREFERRED EMBODIMENTS

Referring to FIG. 1, an input bin 12 and an output bin 14 are mounted on the tube orienter-loader 10. The chassis of the tube orienter-loader has a horizontal frame 16 attached to a fixed side wall 18 and a moveable side wall 20 slideably mounted on the horizontal frame. A handle 21 secured to the moveable wall allows easy movement. A pair of sloped walls 23 and 25 combine with the end walls 18 and 20 to form a tube receiving hopper portion 62, the length of which is adjustable.

Bars 29 affixed to wall 20 accommodate such adjustment.

The horizontal frame supports the first and second tube support rails 22 and 24, which support the tubes during operation of the orienter unloader. Within the tube support rails are first and second walking beams 26 and 28 that advance the tubes in parallel during the operation of this invention. Mounted on the moveable side wall is a tube axial orienter 30. An idler 32 is mounted on the fixed wall opposite the orienter. Two tube metering means 34 are mounted opposite each other on both side walls. The tube incliner 110 is mounted on the fixed side wall. At the exit end of the tube orienter-loader is an exit brace 36 which is rotatable allowing a tube stop flap 38 to move inwardly in response to rotation of a handle 40. An exit ramp 74 allows unloaded tubes to slide down into the output bin 14. The horizontal frame 16 has an extension 42 providing support for the moveable wall 20 where it is moved. The tube orienter-loader can thereby be adjusted to be as wide as the length of the tubes that are being processed.

It is preferable that the input bin 12 and the output bin 14 be identical in structure. The preferred bin has a rectangular frame 44 having sides 46 that extend about half way down the frame and meet with inclined members 48 that meet approximately at the center point of the bottom of the frame 50. The walls need not be solid, since the tubes need only be supported at their ends. The inclined members are hinged at the sides to allow them to swing open releasing their contents into the receiving hopper portion 62 of the tube orientation assembly.

The input bin 12 is shown with one inclined member 48 in the open position. Handles 51 at the top of the bin allow easy manipulation of the bin and also allow the bin to alternatively be mounted onto receiving rails 52 at the bottom of the frame to serve as an output bin 14. Brackets 54 on the bottom of the bins allow the bins to be mounted onto receivers 56 at the hopper end of the tube orientation assembly. The handles 51 and the brackets 54 are spaced so that a plurality of bins can be stacked on top of each other. The inclined walls 48 each have a release handle 58 that allow the operator to easily open the inclined members of the bins.

A walking beam actuator bar 57 penetrates a slot 53 in the horizontal frame portion 55. The walking beams 26 and 28 are connected together and moved simultaneously by the actuator bar 57.

Figure 2:
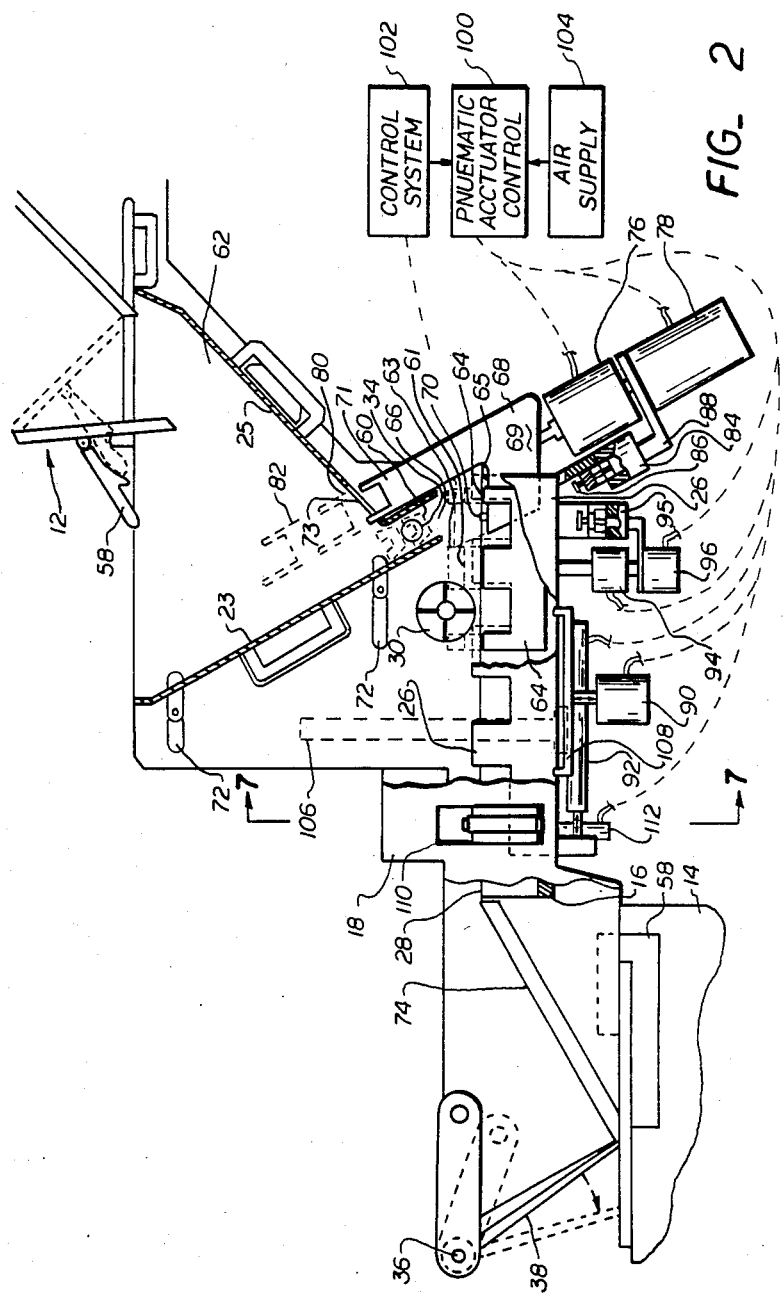
FIG. 2 shows a partially broken side view of the apparatus of FIG. 1.

Referring additionally to FIG. 2, which is a cross-sectional diagram broken at several points to show various details, a DIP tube 60 (shown in phantom) is engaged by metering means 34 disposed at the bottom of the DIP tube hopper 62. The means 34 consists of a pair of pneumatically actuated pads which are adapted to engage the opposite ends of a DIP tube to prevent its passage through the opening 66 in the bottom of hopper portion 62.

A pair of DIP tube retainer and lifter beams 64 are disposed immediately below the DIP tube exit slot 66 from the hopper 62. The pneumatically actuated lifter beams 64 are actuable between a lowered position (with their upper extremities below the tops of walking beams 26 and 28), and a first up position 61 and a second up position 63. A singulator-actuator means 68 includes three spaced apart but joined together upstanding members 69 including agitator portions 71 adapted to extend upwardly through openings 73 (see also FIG. 1) and to agitate DIP tubes contained in bin 62. A singulator-agitator means 68 (shown in phantom) rises from beneath walking beams 26 and 28 to meet and receive on shoulders 65 each tube as the metering means 34 releases it. A pair of micro switches 70 are in position proximate each walking beam to close when the singulator-agitator lowers a tube to rest upon them. The walking beam 26 (and 28) moves the tubes forward on the tube support rail 22 (and 24). The tube orienter 30 is mounted in the moveable side wall 20 to engage and orient the tubes top side up as they are advanced past it.

The width of the exit slot 66 can be adjusted by the adjustment means 72. The size of the tube exit slot 66 is adjusted such that no more than one DIP tube can exit at a time. The upper and lower width adjustment means 72 include slots with conventional screw means that allow easy adjustment of the position of wall 23 relative to wall 25.

Tubes passing through the exit slot 66 are supported on the tube support rail 28 and advanced along the table by the walking beams 26 and 28 from operation station to operation station. In the illustrated embodiment, the operating stations include a tube orienting station located between the orienter 30 and idler 32, and the tube discharge station at incliner 110. At the end of the tube support table are downwardly sloping ramps 74 upon which the tubes slide into the exit bin 14. The exit brace 36 above the tube ramps provides a means for supporting the tube stop flap 38 and allows it to be rotated inwardly and outwardly (as shown in phantom) by means of the handle 40.

The singulator-agitator 68 is directly connected to a first pneumatic cylinder 76 which is in turn mounted on a second pneumatic cylinder 78. When the first pneumatic cylinder 76 is activated, the singulator-agitator is extended into hopper 62 to a first level 80 (shown in phantom) and withdrawn. If the micro switches 70 are not both closed by a tube carried downwardly to the rails on the shoulders 65, the second cylinder 78 as well as the first cylinder 76 is actuated raising the agitation arms to a second position 82 (shown in phantom) and withdrawn. The tubes inside the hopper are therefore agitated, clearing away jams, and oriented parallel to the tube exit slot.

Adjustment of the two pneumatic cylinders 76 and 78 is accomplished by adjusting a vertical adjust bracket 84. The vertical adjust bracket has a screw 86 that is attached to the end of a support bracket 88 for the pneumatic cylinder.

The walking beams 26 and 28 are raised by a pneumatic cylinder 90 and moved forward and back by a pneumatic cylinder 92, both of which are mounted on the chassis (not shown). The tube lifting beams 64 are moved by a pneumatic cylinder 94 and a pneumatic cylinder 96. A vertical adjust bracket 95 allows adjustment of the lifting beam 64. The pneumatic cylinders are controlled by pneumatic actuator control means 100 in a manner known in the art. Control means 100 responds to a programmed system control means 102 that monitors the various sensing devices in the apparatus and directs operation thereof. An air supply 104 provides air for the pneumatic cylinders.

The vertical member 106 is an extension of handle 21 and is attached to wall 20. A lower part thereof extends into a slot in the horizontal frame portion 55. A set plate 108 allows member 106 and the movable wall 20 to be secured in a selected position when retaining bolts (not shown) are tightened.

The tube incliner 110 is mounted on the fixed wall 18 (shown broken out). It is actuated by a pneumatic cylinder 112.

Figure 3:
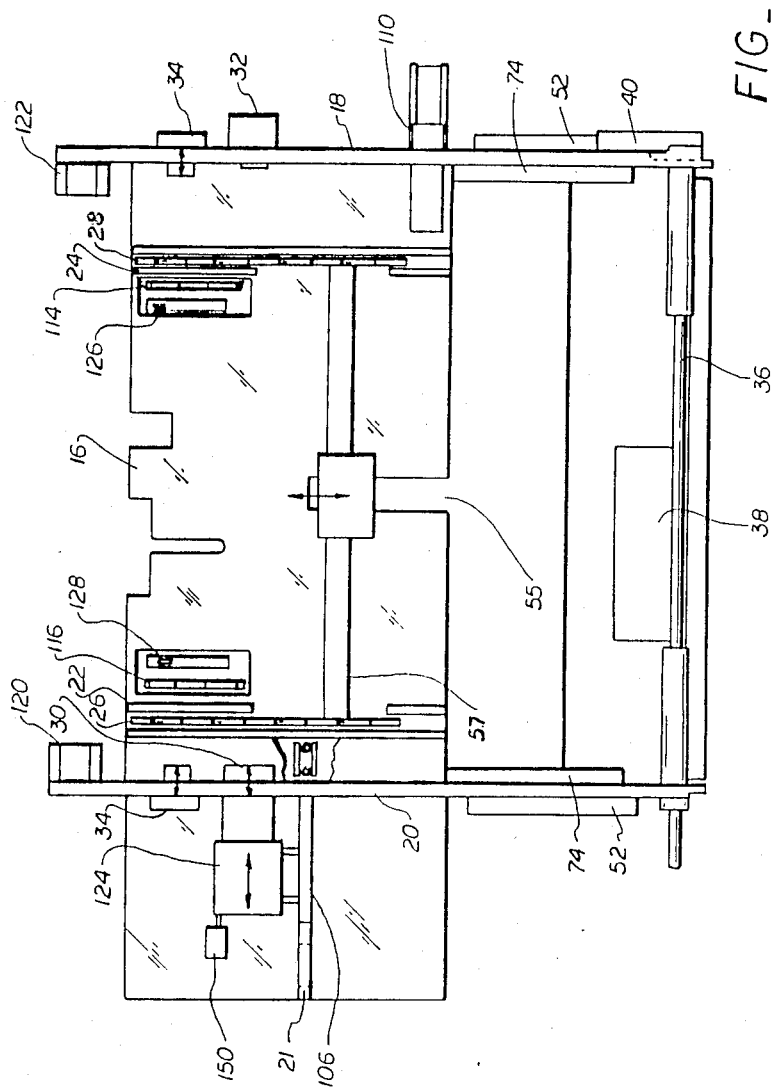
FIG. 3 shows a top view of the horizontal frame of the apparatus of FIG. 1.

Referring to FIG. 3, the horizontal frame member 16 is shown to extend between the fixed end wall 18 and the moveable end wall 20 and penetrates the moveable end wall. The horizontal frame member 16 supports a first tube support rail 22 and a second tube support rail 24 which contain a first walking beam 26 and a second walking beam 28. A first tube lifter 114 and second tube lifter 116 are located beside the tube support rails. The walking beam actuator arm 57 extends through the horizontal frame member 16 and connects to each walking beam.

The handle 21 is a part of the vertical frame member 106 which serves as a mounting for the motor 124 of the tube orienter 30, the distal end of which pass through wall 20. The idler 32 is disposed in wall 18 opposite the tube orienter 30. Two pneumatically operated metering devices 34 are mounted opposite each other on the two walls 18 and 20.

A first microswitch 126 and second microswitch 128 detect each end of a tube as it is lowered to rest on the rails 22, 24. If one or both are not switched when the singulator is lowered to bring a tube down, the singulator-agitator is actuated as described above to agitate the tubes in bin 62 and cause a tube to pass through the exit opening 66 (FIG. 2).

A pair of tube support brackets 120 and 122 are mounted on the moveable end wall 20 and the fixed end wall 18 to facilitate adjustment of the moveable end wall 20 so that its operation from wall 18 corresponds to the length of the tube being processed. The ends of the tube are laid in a depression in each bracket so that each end is supported by a bracket and the moveable end wall is adjusted by pulling the handle so that the width between the two end walls is exactly the length of the tube.

The tube incliner 110 for unloading the tube is mounted in the fixed end wall 18. It allows the tube to be inclined so that the DIPs will slide out under the influence of gravity thereby emptying the tube. The downwardly inclined raps 74 allow the emptied tube to slide down into an output bin (not shown) which is normally supported by the bin support brackets 52.

The tube stop flap 38 mounted on the brace 36 is moved by rotating the handle 40. When in operation, the output bin can be removed and the tubes temporarily collected on the ramps 74 as they are stopped thereon by the stop flap 38. When a new output bin is attached to the brackets 52, the operator turns the handle 40 downwardly allowing the collected tubes to empty into the output bin and ordinary operation is resumed.

Figure 4:
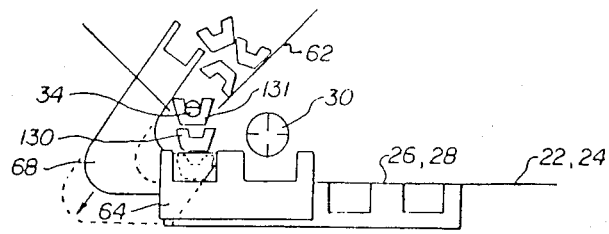
Figure 4:
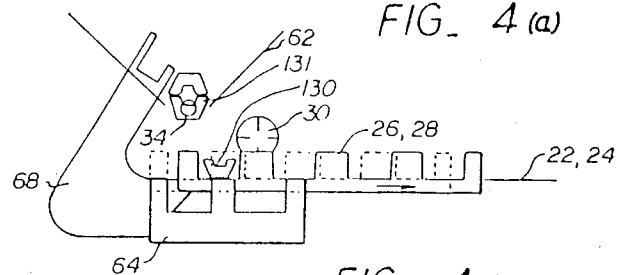
Figure 4:
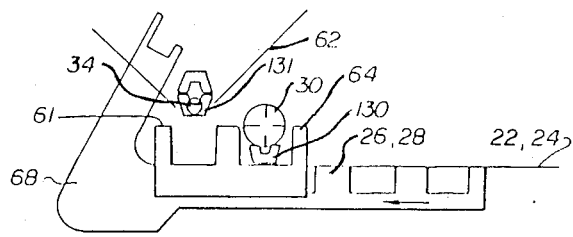
Figure 4:
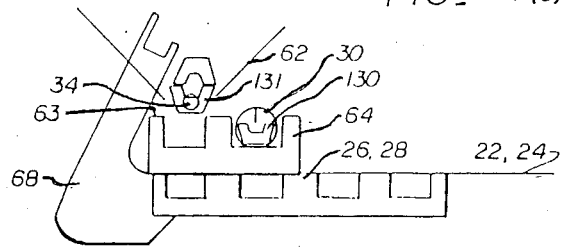

Referring now to FIG. 4a, a plurality of tubes are shown contained in the tube hopper 62. The singulator-agitator 68 is shown raised into its first position so that when a tube 130 held by the tube metering means 34 is released, it drops onto the shoulders 65 and temporarily supports the next tube 131 at the tube metering means 34 allowing it to be engaged and retained in position by the metering means 34. Note that lifter 64 is in its first raised position to ensure that tube 130 is properly aligned as it is lowered onto rails 22 and 24. Beams 26 and 28 are then raised and lifter 64 is lowered and as shown in FIG. 4b, the walking beams 26 and 28 are moved rightwardly to advance the tube 130 resting on the tube support rails 28 to the next operational station as shown in FIG. 4c. At this time, the tube lifter 64 is raised into its first position and the walking beams are retracted. As shown in FIG. 4d, the lifters 64 are then moved to a second position raising the tube 130 to a position such that it can be engaged by the orienting means 30 which senses its orientation and, if necessary, rotates it into the desired orientation. Thereafter, means 30 is retracted, repositioning the tube on lifters 64 which then lower the tube onto rails 22, 24. Beams 26, 28 are then raised and actuated to move the tube 130 rightwardly. They are then lowered and the process is repeated. During each cycle, the tube advances down the tube support rail propelled by the walking beams. A plurality of operational stations can be provided in the path of the tube.

In FIG. 5, the tube orienter 30 is shown to have a face piece 140 that extends through an opening 139 in wall 20 and contacts a tube 142 (shown in phantom), a detection means 144 that detects the orientation of the tube, and a stepper motor 146. Components 142 and 144 are mounted on a shaft 145 driven by motor 146 so that the assembly rotates to orient the tube correctly. The orienter assembly is mounted on a moveable stage 148 that moves toward and away from the tube in response to the urging of a pneumatic piston 150.

The tube is centered on the face plate 140 by the inwardly sloping sides 152 of a collar surrounding the face plate. Because the DIP tubes are generally U-shaped, three of the feelers 153, 154, and 155 will be depressed by the end of the tube but one will not. (The three depressed feelers are shown in phantom as being depressed by the phantom tube.)

The feeler members are identical in structure and operation and as shown in FIG. 6 consist of a rod that has a feeler end 160 and a light obstructing end 162 that is moved inwardly and outwardly into a photoelectric cavity 164. The light obstructing end moves inwardly from a rest position 166 to the light interfering position 168 (shown in phantom) thereby blocking the path of light, generated at a source 170, to a photocell detector 172. In response to the outputs of the four sensors. The position of the tube is sensed by external logic which then drives the stepper motor 146 enough to rotate the tube into a predetermined orientation.

The photoelectric cavities 164 are mounted on a turntable 147 carried by shaft 145. The stage 148 has a perpendicular bracket 174 that is slideably mounted to the vertical frame 106. As shown, a bolt 176 slideably supports the bracket 174 by penetrating a slot 178 therein. When in operation, the tube orienter moves from a non-engaging position with its end flush with the side wall 20 to an extended position as shown, to engage a tube. The other end of the tube is engaged by the idler 32 mounted on the fixed side wall (see FIG. 1). The surface of the idler is preferably roughened to prevent tube slippage when the tube is being rotated.

Referring now to FIG. 7 which is a partial cross-section taken along the line 7—7 of FIG. 1, for reference, the horizontal plate 16 is shown attached to the fixed side wall 18. A tube incliner 110 is deposed with one end extending into an opening 111 in the side wall and is mounted on the wall by a hinge 180 allowing it to swing upwardly into the position shown by the dashed lines 184. The tube support rail 182 and the support surface 183 of the tube incliner are at the same level so as to allow the tubes 185 to slide sideways into alignment with the incliner. The incliner is then rotated around the hinge 180 to the inclined position 184 in response to upward movement of the pneumatic actuator 186 mounted below the horizontal frame. The actuator shaft 187 is connected to the incliner by a pivot 185 that extends through an opening 189 in the horizontal frame. An end stop 188 disposed within the incliner 110 prevents the tube from sliding out when inclined, but allows the DIPs contained in the tube to unload by sliding freely out of the tube and onto an exit ramp 190. One DIP 192 is shown sliding down the ramp. A photoelectric device 194 mounted on the ramp 190 senses when the contents of the tube have stopped emptying and retracts the actuator 186, placing the tube back onto the rail for further advancement.

As an addition to the present invention, it may be desirable to provide a means for extracting the pegs or other means normally used to prevent the DIPs from spilling from the tubes. In such a case, an opening would be provided in the top of incliner 110 to provide a suitable peg pulling mechanism 196 with access to the pegs 197 in the ends of the loaded tubes 185.

Whereas the above embodiment has been described as a device for emptying DIPs from DIP tubes, it will be appreciated that with slight modification, the device can also be used to load DIPs into tubes. In FIGS. 8 and 9 one such modification is suggested. In this embodiment, instead of providing means for tilting the tubes up, means is provided on the opposite side of frame 16 for tilting them down so that DIPs may slide into an unpegged end of the tubes. As illustrated, an opening 201 is provided in a side wall 18 adjacent the downstream edge of the horizontal frame 16 and end of the rails 22, 24. Disposed to extend along and above the edge of frame 16 is an elongated tube support member 204 which extends into opening 201 and is pivotally connected to wall 18 and 206. A tube 202 is supported along most of its length by the tube support 204. A tube gripper 208 is pivotally mounted on the same hinge pin 206 and has a non-gripping rest position 209.

When a tube 202 is placed on the tube support 204, a pneumatic actuator 212, pivotally connected to the tube gripper by a hinge pin 214, moves the gripper from the raised rest position to the illustrated tube engaging position firmly securing the tube between the gripper 209 and the tube support 204. When enough force has been applied to overcome the force of the compression spring 210, which urges the tube support into the horizontal non-inclined position, the support 204 and tube are rotated downwardly into alignment with the input rail 217 of a ramp 218. DIPs 219 can then move down rail 217 and load into the tube 20. When filled as indicated by a suitable sensor (not shown), actuator 212 will cause support 204 to rotate back to its horizontal position and gripper 208 will continue to rotate into its tube releasing position. At such time, the walking beams 26, 28 will cause a new tube to move into position on member 204 discharging the filled tube 220.

In order to insure that an unfilled tube is not pushed all the way across member 204 before it is engaged by the gripper 208, suitable stop means is provided as indicated in FIG. 9. As depicted a first tube 220 is advanced past the tube loading station by a second tube 222 as it is moved into place by the walking beam 26. The tube gripper 208 has two downwardly turned extensions 224 and 226 which allow a firm grip of the tube so it does not slide during its inclination. The first tube 220 is momentarily supported on the ramp 74, by a detent member 228 moved into position by a pneumatic actuator 230 allowing the second tube 224 to be properly centered in the tube gripper. The first tube 220 is then released to slide down the ramp.

For reasons similar to those stated with regard to the embodiment of FIG. 7, it may be desirable to provide a means for inserting pegs 205 into the ends of filled tubes 202. In such case, an opening 207 might be provided in gripper 208 to provide the peg insertion means 211 with access to the tubes 202 after they are filled but before they are released from the control of gripper 208.

Having disclosed both unloader and a loader configuration of the present invention, a combination thereof will naturely follow. Referring to FIG. 10, a tube orienter-unloader 230 is attached to an operational station 232, such as a lead straightner, trimmer, tester or the like, which is in turn attached to a tube orienter-loader 234. Full DIP shipment tubes are then placed in an input bin 236 for full tubes. Each tube is then inclined as indicated at 237 and unloaded onto a process ramp 238 one at a time. The empty tubes are collected in an output bin 239 for empty tubes.

The DIPs 240 travel past an operational station where one or several operations are performed on them. These operations can include marking, testing, lead straighting and the like. Which rejected DIPs may be collected on a reject rail 244, the processed DIPs are loaded back into shipment tubes 247 at the tube orienter-loader 234. Empty tubes, which can have originated from the output bin 239, are placed in the input bin 246. The loaded tubes are collected in the output bin 248.

By the use of this invention, the tubes need never be individually handled by the operator. Tubes may be loaded into the bins by the handful and the present invention used to automatically orient and unload or load them. Since the usual application for this invention will involve both unloading and reloading of tubes, the interchangeability of the bins is a convenient feature.

The operational timing of the present invention is important since in a continuous operation, several tubes will be operated on simultaneously. FIG. 11 is a timing diagram which representationally illustrates operation of the several functional components. When the first tube is discharged from the input hopper 62, the apparatus goes through the operations of raising the tube lifter, placing a single tube on the shoulder of the singulator-agitator by unclamping the metering means and then clamping the next tube to be discharged from the hopper. At the same time, another tube can be emptying and yet another can be in the process of being oriented. The apparatus waits for the tube being emptied to finish and then causes the tube lifter to move up to retrieve the newly oriented tube as the orienter disengages. The lifter then moves down and the walking beam moves up and forward. The tube lifter then again moves up to the first level to prevent movement as the walking beam moves down. The tube is then lifted to the orienter which engages and rotates the tube. The tube incliner then moves to empty a fresh tube. As this happens the tube lifter goes down to the first position to start the cycle again.

DIP tubes are discharged from the hopper one at a time onto the tube support rails. If a jam is detected by the failure of the microswitches to engage when the metering means disengages, the tube singulator-agitator is actuated to agitate the tubes in the hopper thereby clearing the jammed tubes. Once on the rails, a tube is advanced to the tube orientation station where it is lifted and engaged for orientation. The photo-detection devices sense the orientation of the tube and cause it to be correctly oriented. The walking beam then advances the correctly oriented tube along the support rails to the inclination station where the tube is inclined, and the DIPs are allowed to exit from the tube under the influence of gravity. When unloaded, a photoelectric sensor senses that DIPs have stopped passing by and causes the tube to be rotated back into the plane of the support rails. When the device is used as a tube loader, the number of DIPs input to a tube are counted until the correct number have been loaded. The tube is then rotated back to the horizontal position and the walking beam is advanced to push the loaded tube onto an inclined ramp and into an output bin.

Although the above-described embodiment has been found suitable for use with all commonly used DIP sizes, it has also been found that on occasion, due to the particular dimensions of the side legs of the tubes used to contain type 600 DIPs, three of the tubes will become interlocked in the manner illustrated in FIG. 12(a) and cause a join that in some circumstances cannot be dislodged by the agitator of the above-described embodiment. In order to provide an alternative capable of dealing with the occasionally interlocked tubes, the following embodiment has been developed.

Referring now to FIGS. 12(b), 13, 14 and 15, it will be noted that the input hopper 62 has been modified and the singulator-agitator 68 has been eliminated in favor of a new agitation and singulation mechanism including three roller carrying rotary shafts 300, 302 and 304, associated drive mechanisms 306, and two tube sensing and lowering mechanisms 308 and 310. As shown more clearly in FIG. 13, the shafts 300, 302, 304 respectively carry a plurality of rollers 312, 314 and 316 disposed along the lengths thereof. The rollers 312 and 314 are elongated cylinders of approximately 1.25 inches in length while rollers 316 are much shorter in length, e.g., approximately ⅛ inch in length. As suggested in FIG. 12, the spacing between the facing surfaces of rollers 312 and 314 is chosen to be slightly greater than the vertical cross-sectional dimension of a type 600 DIP tube. All of the rollers are approximately one inch in diameter and are made of 35 durometer natural rubber to assure good frictional contact with the surfaces of the plastic DIP tubes.

As is shown in FIG. 14, the roller carrying shafts 300–304 are driven by a reversible stepper motor 318, or the like, via a drive sprocket 320, driver sprockets 322, 324, 326 and 328 and drive chains 330 and 332. Note that proper tension is maintained in chain 330 by a suitable tensioning mechanism 334. In the preferred embodiment, sprockets 322, 326 and 328 are approximately one inch in diameter while sprocket 324 has a diameter of approximately 1.5 inches. Sprocket 326 includes an internal slip clutching mechanism 327 that causes it to be driven when shaft 302 is rotated in the clockwise direction (FIG. 14) but to slip when shaft 302 is rotated in the opposite direction.

In operation, if no DIP is presently resting on and closing both of switches 308 and 310, motor 318 will be energized to drive sprockets 322, 324, 326, 328 and the associated rollers in the clockwise direction for 75 milliseconds followed by a reversal in direction for 75 milliseconds and the cycle will be repeated six times unless interrupted (at any point during a cycle) by the closure of both switches 308 and 310. Note however that sprockets 326 and 328 and their associated rollers 316 will not be driven in the counter-clockwise direction due to operation of the slip clutch. As will be apparent from FIG. 13, clockwise rotation of rollers 312 and 314 causes tube resting thereupon to tend to rotate in the counter-clockwise direction until it is oriented such that it can pass through the gap between the rollers. The clockwise rotation of rollers 316 tends to lift tubes positioned above the tube or tubes engaged by rollers 314 so that the lower positioned tubes can be rotated by rollers 312 and 314. If no tube slips through the gap during clockwise rotation, typically as a result of the interlocking or disarray of the tubes in the vicinity of the rollers, the direction of rotation of rollers 312 and 314 is reversed and has the effect of changing the direction of agitation of the tubes so that they tend to disengage any interlocking and become stacked in parallel fashion. If no tube slips through the gap during this reversal, the cycle will be repeated until one tube does drip through or six cycles have been completed. If no tube drops through the gap at the completion of the sixth agitation cycle, an alarm will be sounded and operation of the device will be interrupted.

Other than the fact that the tube agitation in the input hopper is accomplished in a different fashion, the further operation of the device is similar to that described above. Briefly stated, and referring to FIGS. 13 and 15, operation begins with the raising of the switches and tube lowering mechanisms 308 and 310 by actuation of pneumatic actuators 338 and the commencement of the agitation operation. As soon as the presence of a tube 340 is sensed by the raised switches 308 and 310, the stops 34 are actuated to grip and hold in lace a second tube 342, and the actuators 94 and 96 are energized to raise the lifters 64 into their first lifted position 64'. Actuators 96 and 338 are then actuated to respectively lower the lifters 64 into their second lift position 64" and lower the tube 340 into a position resting on the rails 22, 24. Walking beams 26, 28 are then raised by actuator 90 to enclose tube 340 in their first notch and lifts 64 are lowered. Actuator 92 then moves beams 26, 28 forwardly to position tube 340 on rails 22, 24 beneath orienter 30. Lifter 64 is then raised into its first position 64' to locate tube 340 for engagement by orienter 38, orienter 30 is engaged, lifter 64 is lowered to position 64", tube 340 is then rotationally oriented if necessary, lifter 64 is then again raised to position 64'. Orienter 30 then disengages tube 340 allowing it to rest on lifter 64. At this point, switches 308, 310 are raised and stops 34 are retracted to allow the second tube 342 to drop onto switches 308 and 310. If both switches are not closed by tube 342, the agitation cycle will be commenced. If both switches are closed, then stops 34 will be actuated and the operation cycle will be repeated with tube 340 being lowered and incremented forwardly and tube 342 being lowered and place beneath orienter 30.

Although the present invention has been disclosed above with regard to particular embodiment, it is anticipated that numerous alterations and modifications will become apparent to those skilled in the art after having read this disclosure. It is therefore intended that the following claims be interpreted as covering all such modifications as fall within the true spirit and scope of the invention.

What is claimed is:

1. Apparatus for loading/unloading DIP container tubes, comprising:
    input hopper means for receiving a plurality of DIP container tubes and including metering means for discharging said tubes therefrom one at a time;

means forming an orientation station including orienting means operative to detect the orientation of a tube and to rotate said tube about its longitudinal axis into a predetermined orientation such that DIPs contained therein, or to be contained therein, will be similarly oriented;

means forming a tube load/unload station and including inclining means for orienting a tube in a predetermined inclined position such that DIPs may be caused to move through the tube under the influence of gravity;

output hopper means for receiving tubes after they have been loaded or unloaded; and tube moving means for moving a tube from said input hopper means to said orientation station and then to said load/unload station and then to said output hopper means.

2. Apparatus as recited in claim 1 wherein said tube moving means includes guide means extending from said input hopper means to said output hopper means and along which a tube may be moved, and tube engaging means for engaging a tube as it is discharged from said input hopper means and for causing it to be moved along said guide means.

3. Apparatus as recited in claim 2 wherein said guide means includes rail means having an upper surface along which said tubes may be moved and wherein said tube engaging means includes walking beam means including a plurality of tube receiving notches, and means for drivably moving said beam means from a first position disposed beneath said surface to a second position extending above said surface, wherein a tube discharged from said input hopper means may be received within one of its notches, then longitudinally along said rail means a predetermined distance to a third position carrying the received tube therewith to a position beneath said surface, and then back to said first position.

4. Apparatus as recited in claim 3 and further comprising retainer/lifter means normally disposed in a first position beneath said upper surface and moveable into a second position extending above said surface wherein it serves to retain a tube at a particular position as said beam means is raised to extend above said upper surface and lowered into position beneath said upper surface.

5. Apparatus as recited in claim 4 wherein said retainer/lifter means includes a first notch disposed for receiving a tube discharged from said input hopper means and a second notch disposed in alignment with said orientation station, and further including means for moving said retainer/lifter means into a third position above said upper surface such that a tube disposed within said second notch is raised above said surface and into a position where it may be engaged by said orienting means.

6. Apparatus as recited in claim 5 wherein said orienting means includes sensor means disposed to engage an end of a tube raised into alignment by said retainer/lifter means and operative to detect the present orientation of the engaged tube, and means for rotating said tube about its longitudinal axis into said predetermined orientation.

7. Apparatus as recited in claim 6 wherein said sensor means includes a plurality of spring-loaded feeler means disposed about an axis of rotation and adapted to engage an end surface of a tube engaged by said orienting means and be depressed thereby, and means for detecting the position of a feeler not depressed by the tube end and using such detection as an indication of the present orientation of the tube.

8. Apparatus as recited in claim 7 wherein said inclining means includes a tube end portion engaging means for receiving an end portion of a tube disposed in said load/unload station, and means for rotating said end portion engaging means about an axis transverse to the longitudinal axis of said tube thereby causing said tube to be rotated about said transverse axis into said predetermined inclined position.

9. Apparatus as recited in claim 8 wherein said end portion engaging means includes a support member disposed for pivotal rotation about said transverse axis and spring-loaded to normally reside in a tube receiving position, a tube gripping member pivotally disposed to rotate about said transverse axis, and means for driveably rotating said gripping member from a first position above the end of a tube disposed in said load/unload station into a second position engaging the top of said tube and then into a third position in which it causes said tube and said support member to be rotated into said predetermined inclined position.

10. Apparatus as recited in claim 1 wherein said input hopper means further includes a discharge slot in the bottom thereof and agitating means for agitating tubes disposed in said input hopper means and causing them to move into alignment with said discharge slot.

11. Apparatus as recited in claim 10 wherein said agitating means includes a tube receiving and support member disposed beneath said discharge slot and moveable between a tube receiving position and lower position.

12. Apparatus as recited in claim 11 wherein said metering means includes stop means for engaging a tube residing in said discharge slot and holding same in position until it is to be discharged from said input hopper means.

13. Apparatus as recited in claim 12 wherein said support member and said metering means combine to form a singulating means for discharging one tube at a time through said discharge slot.

14. Apparatus as recited in claim 13 wherein said input hopper means and said output hopper means are respectively adapted to mate with a removeable tube supply bin and a removeable tube receiver bin.

15. Apparatus as recited in claim 10 wherein said agitating means includes:
at least one rotatably mounted shaft disposed to extend across said input hopper means in parallel with said discharge slot;
roller means carried by said shaft and adapted to engage and import frictional forces to tubes disposed in said input hopper means tending to cause said tubes to rotate and reposition themselves within said input hopper means prior to exiting through said discharge slot; and
drive means for imparting rotational motion to said shaft and roller means.

16. Apparatus as recited in claim 10 wherein said agitating means includes first and second rotationally mounted shafts respectively disposed on opposite sides of said discharge slot and extending across said input hopper means in parallel with said discharge slot;
first and second roller means carried by said shafts and adapted to engage and impart frictional forces to tubes disposed in said input hopper means tending to cause said tubes to rotate and reposition themselves within said input hopper means prior to exiting through said discharge slot; and drive means driveably coupled to said first and second shafts for imparting rotational motion to said shafts and roller means.

17. Apparatus as recited in claim 16 and further including a third shaft disposed adjacent one of said first and second shafts and extending in parallel thereto across said input hopper means, said third shaft having third roller means carried thereby and being driveably coupled to said drive means and operative to frictionally engage tubes disposed above those engaged by said first and second roller means and to assist said tubes in repositioning themselves.

18. Apparatus as recited in claim 17 wherein said first and second roller means are spaced apart a predetermined distance suitable for allowing only one tube at a time to pass therebetween and wherein said drive means is adapted to alternate rotation of said first and second roller in first one direction and then the other.

19. Apparatus as recited in claim 18 wherein said third shaft is coupled to said drive means by a clutching means such that it is driven in said one direction and not in the other.

20. Apparatus as recited in claim 19 and further including a tube sensing and lowering means moveable between a first position immediately below said discharge slot and a second position lower then said first position, and means responsive to signals generated by said sensing and lowering means when it is in said first position and senses that a tube rests thereupon, and operative to cause said metering means to temporarily block said discharge slot and to cause said sensing and lowering means to move to said second position and lower the tube resting thereupon to a position where it may be engaged by said tube moving means.

21. Apparatus as recited in claim 1 wherein said inclining means includes a tube end portion engaging means for receiving an end portion of a tube disposed in said load/unload station, and means for rotating said end portion engaging means about an axis transverse to the longitudinal axis of said tube thereby causing said tube to be rotated about said transverse axis into said predetermined inclined position.

22. Apparatus as recited in claim 21 wherein said end portion engaging means includes a support member disposed for pivotal rotation about said transverse axis and spring-loaded to normally reside in a tube receiving position, a tube gripping member pivotally disposed to rotate about said transverse axis, and means for driveably rotating said gripping member from a first position above the end of a tube disposed in said load/unload station into a second position engaging the top of said tube and then into a third position in which it causes said tube and said support member to be rotated into said predetermined inclined position.

23. Apparatus as recited in claim 7 wherein said input hopper means further includes a discharge slot in the bottom thereof and agitating means for agitating tubes disposed in said input hopper means and causing them to move into alignment with said discharge slot.

24. Apparatus as recited in claim 23 wherein said agitating means includes a tube receiving and support member disposed beneath said discharge slot and moveable betwen a tube receiving position and lower position.

25. Apparatus as recited in claim 24 wherein said metering means includes stop means for engaging a tube residing in said discharge slot and holding same in position until it is to be discharged from said input hopper means.

26. Apparatus as recited in claim 25 wherein said support member and said metering means combine to form a singulating means for discharging one tube at a time through said dicharge slot.

27. Apparatus as recited in claim 26 wherein said input hopper means and said output hopper means are respectively adapted to mate with a removeable tube supply bin and a removeable tube receiver bin.

* * * * *